US00RE38044E

(19) United States
(12) Reissued Patent
Kruckemeyer

(10) Patent Number: US RE38,044 E
(45) Date of Reissued Patent: Mar. 25, 2003

(54) METHOD FOR DETERRING FORGERIES AND AUTHENTICATING SIGNATURES

(75) Inventor: Robert J. Kruckemeyer, Houston, TX (US)

(73) Assignee: Legends, Inc., Fishkill, NY (US)

( * ) Notice: This patent is subject to a terminal disclaimer.

(21) Appl. No.: 09/728,198

(22) Filed: Dec. 1, 2000

Related U.S. Patent Documents

Reissue of:
(64) Patent No.: 6,030,001
Issued: Feb. 29, 2000
Appl. No.: 08/723,014
Filed: Sep. 30, 1996

U.S. Applications:

(63) Continuation-in-part of application No. 08/627,600, filed on Apr. 4, 1996, now Pat. No. 5,737,886.

(51) Int. Cl.[7] ..... B42D 15/00
(52) U.S. Cl. ..... 283/70; 283/67; 283/72; 283/75; 283/904; 340/825.34; 380/23; 380/54; 705/1
(58) Field of Search ..... 283/67–70, 72, 283/74, 75, 82, 107, 109; 705/904, 1; 235/462.01; 340/825.34; 380/243, 245, 246

(56) References Cited

U.S. PATENT DOCUMENTS

| | | | | | |
|---|---|---|---|---|---|
| 3,571,957 | A | * | 3/1971 | Cumming et al. | 101/369 |
| 4,926,325 | A | * | 5/1990 | Benton et al. | 340/5.74 |
| 5,267,756 | A | | 12/1993 | Molee et al. | |
| 5,380,047 | A | | 1/1995 | Molee et al. | |
| 5,396,559 | A | * | 3/1995 | McGrew | 283/17 |
| 5,561,282 | A | * | 10/1996 | Price et al. | 178/18.03 |
| 5,737,886 | A | * | 4/1998 | Kruckemeyer | 283/67 |

* cited by examiner

*Primary Examiner*—A. L. Wellington
*Assistant Examiner*—Monica Carter
(74) *Attorney, Agent, or Firm*—Anthony F. Matheny; Andrews & Kurth L.L.P.

(57) ABSTRACT

A method for deterring forgeries and authenticating signatures placed on any document or other object (collectively "Item") is disclosed. A first two dimensional bar code or forgery-proof diffraction grating pattern or similar information bearing medium (Electronic Fingerprint or "EF") is issued to a person whose signature is being protected ("Principal") by a central registrar ("CR"). A personal identification number ("PIN") which has been assigned by the CR to the Principal is encoded on the EF. The PIN remains constant and is encoded on all EFs distributed to the Principal.

20 Claims, 7 Drawing Sheets

LAST WILL AND TESTAMENT OF ←20
JOHN Q. PUBLIC PAGE 8

Maximum Marital Deduction Amount shall be distributed in the same manner as the residue of my estate.

7.5 References to my "Personal Items" are to all of my interest in any automobiles, clothing, jewelry, household goods, furniture and furnishings, other articles of personal use or ornament, and other personal effects of a similar nature, use or classification.

IN TESTIMONY WHEREOF, and in the presence of two Witnesses, who are acting as witnesses at my request, in my presence and in the presence of each other, I hereunto sign my name, on this the 21st day of June, 1996.

John Q Public ←11
JOHN Q. PUBLIC, Testator ←10

←30
←31
←32

The foregoing instrument was signed by the Testator in our presence and declared by him to be his LAST WILL AND TESTAMENT, an we, the undersigned Witnesses, sign our names hereunto as witnesses at the request and in the presence of the said Testator, and in the presence of each other, on this the 21st day of June, 1996.

Helen Albright
Witness

Kathy Morris
Witness

FIG. 1

LAST WILL AND TESTAMENT OF ←20
JOHN Q. PUBLIC PAGE 8

Maximum Marital Deduction Amount shall be distributed in the same manner as the residue of my estate.

7.5 References to my "Personal Items" are to all of my interest in any automobiles, clothing, jewelry, household goods, furniture and furnishings, other articles of personal use or ornament, and other personal effects of a similar nature, use or classification.

IN TESTIMONY WHEREOF, and in the presence of two Witnesses, who are acting as witnesses at my request, in my presence and in the presence of each other, I hereunto sign my name, on this the 21st day of June, 1996.

John Q Public ←11
JOHN Q. PUBLIC, Testator ←10

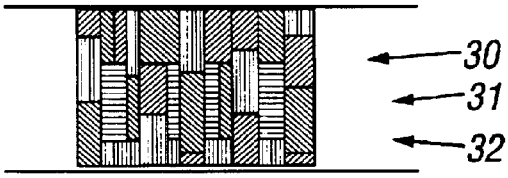
←30
←31
←32

The foregoing instrument was signed by the Testator in our presence and declared by him to be his LAST WILL AND TESTAMENT, an we, the undersigned Witnesses, sign our names hereunto as witnesses at the request and in the presence of the said Testator, and in the presence of each other, on this the 21st day of June, 1996.

Helen Albright
Witness

Kathy Morris
Witness

FIG. 1A

LAST WILL AND TESTAMENT OF ←20
JOHN Q. PUBLIC PAGE 8

Maximum Marital Deduction Amount shall be distributed in the same manner as the residue of my estate.

7.5 References to my "Personal Items" are to all of my interest in any automobiles, clothing, jewelry, household goods, furniture and furnishings, other articles of personal use or ornament, and other personal effects of a similar nature, use or classification.

IN TESTIMONY WHEREOF, and in the presence of two Witnesses, who are acting as witnesses at my request, in my presence and in the presence of each other, I hereunto sign my name, on this the 21st day of June, 1996.

John Q Public ←11
JOHN Q. PUBLIC, Testator ←10

←30

←31
←32
←33

The foregoing instrument was signed by the Testator in our presence and declared by him to be his LAST WILL AND TESTAMENT, an we, the undersigned Witnesses, sign our names hereunto as witnesses at the request and in the presence of the said Testator, and in the presence of each other, on this the 21st day of June, 1996.

Helen Albright
Witness

Kathy Morris
Witness

FIG. 2

CERTIFICATE OF AUTHENTICITY ← 60

10 10

The Central Registrar hereby certifies the the item described herein was signed by John Q. Public, in the presence of an agent of the Central Registrar or that John Q. Public, personally verified to an agent of the Central Registrar that the item described herein displays his signature.

The Central Registrar further certifies that the electronic fingerprint found on the item described herein was issued to John Q. Public . ← 10

Description of Item: Last Will and Testament of John Q. Public dated June 21, 1996 61

Name of Original Registrant: John Q. Public . ← 62

Date of Original Registration: June 21, 1996 . ← 63

Names of Subsequent Registrants and Dates of Subsequent Registrations:

62A → _____ _____ ← 63A

10A →

Names of Present Registrant and Date of Present Registration:

John Q. Public ← 62B June 21, 1996 ← 63B

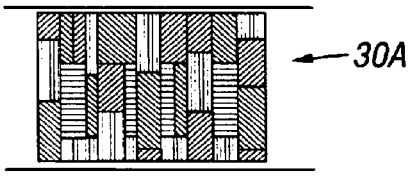

← 30A

DATED: June 21, 1996 ← 64

_____

CENTRAL REGISTRAR ← 90

CERTIF.WPS

FIG. 2A

CERTIFICATE OF AUTHENTICITY ← 60B 10 10

The Central Registrar hereby certifies the the item described herein was signed by John Q. Public, in the presence of an agent of the Central Registrar or that John Q. Public, personally verified to an agent of the Central Registrar that the item described herein displays his signature.

The Central Registrar further certifies that the electronic fingerprint found on the item described herein was issued to John Q. Public. ← 10

Description of Item: Last Will and Testament of John Q. Public dated June 21, 1996 61

Name of Original Registrant: John Q. Public. ← 62

Date of Original Registration: June 21, 1996. ← 63

Names of Subsequent Registrants and Dates of Subsequent Registrations:

62A → _____ _____ ← 63A

10A →

Names of Present Registrant and Date of Present Registration:

John Q. Public ← 62B June 21, 1996 ← 63B

30A

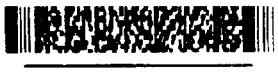

DATED: June 21, 1996 ← 64

CENTRAL REGISTRAR ← 90

FIG. 3

CERTIFICATE OF AUTHENTICITY ← 60A

The Central Registrar hereby certifies that the electronic fingerprint found on the Item described herein was issued to John Q. Public. ← 10

The Central Registrar further certifies that the following information concerning the Item is found in the records of the Central Registrar:

Description of Item: Last Will and Testament of John Q. Public dated June 21, 1996 ← 61

Name of Original Registrant: Mary S. Public ← 62

Date of Original Registration: June 18, 1996 ← 63

Names of Subsequent Registrants and Dates of Subsequent Registrations:

62A → _____ _____ ← 63A

10B →

Names of Present Registrant and Date of Present Registration:

John Q. Public ← 62B June 21, 1996 ← 63B

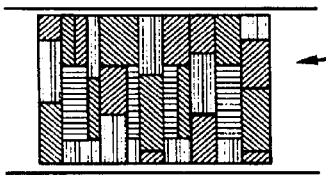

← 30A

DATED: June 18, 1996 ← 64

_____

CENTRAL REGISTRAR ← 90

AUTHENT.WPS

METHOD FOR DETERRING FORGERIES AND AUTHENTICATING SIGNATURES

Matter enclosed in heavy brackets [ ] appears in the original patent but forms no part of this reissue specification; matter printed in italics indicates the additions made by reissue.

CROSS REFERENCE TO RELATED APPLICATION

This application is a continuation-in-part of U.S. application Ser. No. 08/628,600, filed Apr. 4, 1996, by Robert Kruckemeyer, entitled "Method for Deterring Forgeries and Authenticating Signatures" *now U.S. Pat. No. 5,737,886*.

BACKGROUND OF THE INVENTION

1. Field of the Invention

The present invention relates to forgery deterrent and authentication systems and methods, and more particularly to forgery deterrent and authentication systems and methods related to signatures.

2. Background Art

Forgery of signatures has been and remains a problem in all aspects of society wherein value is placed on the authenticity of a signature. This is true whether the signature is placed on an important document such as a will or contract or whether the signature is considered to have intrinsic value such as the signature of a celebrity. Indeed, a forger does not always have to be very good in order to be successful. A system whereby any person whose signature is being protected ("Principal") could deter the forging of his or her signature and obtain authentication of his or her signature by the placement of a unique forgery proof medium next to his or her signature would be useful but is not available today.

An authentication system to guarantee the authenticity of sports memorabilia articles is described in U.S. Pat. No. 5,380,047 dated Jan. 10, 1995 to Molee and Ellis and U.S. Pat. No. 5,267,756 dated Dec. 7, 1993 to Molee and Ellis, both assigned to The Upper Deck Company ("Upper Deck") (collectively "Molee Patents"). The Molee Patents require that the athlete sign the article being authenticated in the presence of an Upper Deck Authenticated representative. Upper Deck then places a hologram that contains a unique serial number on the article. A certificate of authenticity is then prepared by Upper Deck that contains a hologram identical to the hologram placed on the article. The memorabilia is packaged by Upper Deck with a registration card that gives the purchaser of the article the opportunity to register ownership of the article with Upper Deck.

However, the Upper Deck system is not designed to deter the forgery of signatures or to authenticate signatures generally. It is designed as a marketing tool for Upper Deck to ensure to the sports memorabilia buying public that the articles it is selling are authentic. Upper Deck's main business is the marketing of sports memorabilia, and it therefore has a pecuniary interest in ensuring a continuous supply of the very merchandise it is authenticating. Upper Deck's system is not designed to be used outside its market niche. Further, it requires that the article being authenticated be authenticated in the presence of an Upper Deck representative. Additionally, the serial number on the hologram is in no way unique to the athlete that signed the article but is only unique to the Upper Deck article. Upper Deck's system does not allow for the distribution of the authenticating holograms to athletes for their use when not signing in the presence of an Upper Deck representative.

Additionally, the hologram that is used by Upper Deck does not contain any information except the article's serial number. The system taught by the present invention allows a variety of information to be encoded into the information bearing medium including a unique personal identification number, a sequential code and an exact facsimile of the actual signature placed on the item itself.

An object of the present invention is to provide a general forgery deterrent and an authentication system for signatures.

Another object of this invention is to provide the signature with verifiable authentication indicia.

Another object of this invention is to establish a central registrar and data base for electronic fingerprints ("EF") that will encode Personal Identification Number ("PINs"), sequential codes ("Codes") and Facsimile Signatures on EFs.

SUMMARY OF THE INVENTION

According to an exemplary embodiment of the present invention, an EF used is one which is an encrypted two dimensional bar code or alternatively a forgery proof diffraction grating pattern or similar information bearing medium. The EF is issued by a central registrar ("CR") to a Principal. The EF is encoded by the CR with the Principal's PIN and a sequentially numbered associated code ("Code") distinct for each EF distributed. The Principal must acknowledge to the CR, through the use of his or her PIN, that he or she has received physical possession of the EFs before the EFs are considered valid. The Principal affixes the EF to any document or other object ("Item") alongside the signature of the Principal. The EF is affixed to the Item with a tamper proof adhesive. After the EF has been placed on an Item by the Principal, the Principal or subsequent person to whom the Principal has directly or indirectly released the Item ("Holder") of the Item has the option of having the Item authenticated and/or registered with the CR by an agent ("Agent") of the CR. A representative of the CR mechanically or optically reads the EF with an illuminated light or other suitable source which recognizes the PIN as having been issued to the Principal whose signature is affixed to the Item. A description of the Item along with the PIN and Code is registered with the CR The CR then issues a certificate of authenticity ("CA"). If the EF has been affixed to the Item in the presence of an Agent of the CR or if the Principal requests the authentication of the Item, the CA so states. If the CA is requested by a Holder of an Item which has not been previously authenticated by the Principal, the CA verifies that the EF found on the Item was issued to the Principal. The CA describes the Item and the CA itself contains an EF with a PIN and Code identical to the EF affixed to the Item. A record of the ownership of the Item is maintained at the CR. The CR may issue CAs to subsequent Holders of the Item and maintain a record of the transfer of the Item to the subsequent Holder similar to the chain of title to real property maintained by a title policy plant.

In another preferred embodiment of the present invention, the Principal's signature that has been placed on an Item in the presence of an Agent of the CR is scanned by the Agent. The actual signature the Principal has just placed on the Item is encoded into the EF along with the Principal's PIN and Code. When the EF is subsequently read, an exact Facsimile Signature will be displayed on the Agent's computer terminal showing exactly how the actual signature the Principal placed on the Item should look. The EF is printed by the Agent and placed on the Item or an accompanying article.

Registration of the Item takes place immediately with the CR as described above. With this preferred embodiment, a subsequent Holder of the Item will be able to not only verify that the Item has an appropriate EF but will also be able to compare the signature found on the Item to the signature encoded in the EF.

It is an added forgery deterrent to scan the signature the Principal has just placed on an Item into the EF. No Principal signs his name in exactly the same way each time. Even if a forger were somehow able to copy the EF placed on an Item in an attempt to commit a forgery, it would be impossible for the forger to sign the Principal's name in the exact same way that the Facsimile Signature is memorialized in the EF.

BRIEF DESCRIPTION OF THE DRAWINGS

The nature, objects and advantages of the present invention will become better understood through a consideration of the following description taken in conjunction with the following drawings in which like parts are given like reference numerals and wherein:

FIG. 1 illustrates an exemplary of a portion of an Item comprising a Will showing the signature page having an authentication EF which contains a PIN and a Code;

FIG. 1A illustrates an exemplary of an Item comprising a Will showing the signature page having an authentication EF which contains a PIN, Code and Facsimile Signature.

FIG. 2 illustrates an exemplary certificate of authenticity for the signature of the Principal on the Will in FIG 1, wherein the placement of the EF on the Will is witnessed by an Agent of the CR or wherein the CA was requested by the Principal;

FIG. 2A illustrates an exemplary certificate of authenticity for the signature of the Principal on the Will of FIG. 1, wherein the placement of the EF on the Will is witnessed by an Agent of the CR and the Agent scans the Signature into the EF.

FIG. 3 illustrates an exemplary certificate of authenticity for the signature of the Principal on the Will of FIG. 1, wherein the placement of the EF on the Will was not witnessed by an Agent of the CR nor wherein the CA was requested by a Holder.

PREFERRED EMBODIMENTS OF THE PRESENT INVENTION

Figure 4:
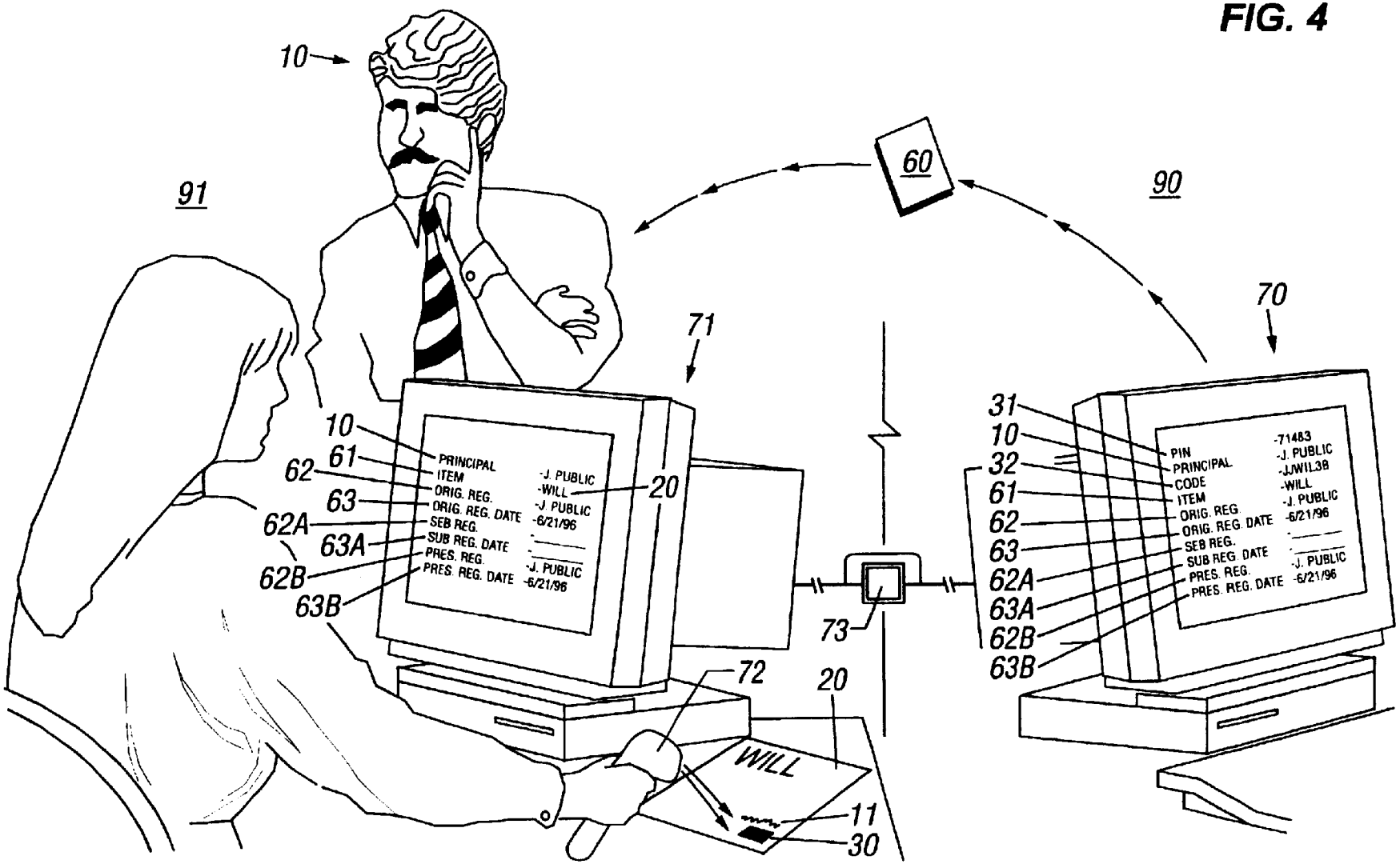
FIG. 4 is a flow diagram of a preferred embodiment of the invention.

The present invention is to enable any person to place his or her own unique EF on any Item at any time to deter forgeries and to authenticate his or her own signature. The present invention does not require that the signing of the Item be witnessed by an Agent on the CR. Because the EF contains a PIN unique to the Principal and also contains a Code unique to the particular EF, it is more secure against forgery. A forger would have to match not only the PIN to the Principal but also the Code to the particular Item onto which the EF was placed in order to complete a forgery.

Another preferred embodiment of the present invention is to enable any Principal to have any signature or mark that they have placed on an Item scanned and encoded into an EF. Therefore an exact Facsimile Signature of the actual signature the Principal has placed on the particular Item is encoded into EF along with the Principal's PIN and the sequential Code. The EF can be affixed to the Item or an accompanying article. In this embodiment a forger would have to match not only the PIN to the Principal and the Code to the Item, but would also have to exactly duplicate the Facsimile Signature that has been encoded into EF onto the forged Item in order to complete the forgery.

As a first preferred embodiment, Principal, as depicted by a name, 10 is presumed to desire to utilize a system to verify his or her signature by contacting a CR, depicted by a signature, 90. The CR 90 would issues to the Principal 10 a unique PIN 31. The CR 90 would also encode all EFs 30 issued to the Principal 10 with the PIN 31 of Principal 10 and also sequentially encodes each EF 30 with a unique Code 32. The EFs 30 provided to the Principal 10, preferably by hand delivery of an Agent, have a tamper proof adhesive. Once the Principal 10 obtains physical possession of the EFs 30, he or she must contact the CR 90 and verify through relating his or her PIN 31 that he or she has obtained physical possession of the EFs 30 before the CR 90 will consider the EFs 30 to be valid. After verification by the Principal, the CR 90 will show the delivered EFs 30 to be valid.

An exemplary document in the form of a Last Will and Testament ("Will") 20 is illustrated in FIG. 1. The Will 20 in this example has a Signature 11 thereon of the Principal 10. After the Principal 10 signs his or her Will 20, he or she would affix an EF 30 to the Will 20 in close proximity to the Signature 11. The EF 30 is preferably comprised of a two dimensional bar code or alternatively a forgery proof diffraction grating pattern, such as shown in U.S. Pat. No. 5,379,131, dated Jan. 3, 1995 to Yamazaki, into which is encoded the Principal's PIN 31 and a Code 32. The EF 30 is affixed to the Will 20 with an adhesive (not shown but as is known in the art) so as to be tamper proof. Once placed, the EF 30 cannot be removed from the Will 20 without destroying the EF 30. The EF 30 cannot be duplicated and the PIN 31 and Code 32 cannot be read without the use of the computer program that encoded them. Therefore the PIN 31 and Code 32 can only be read and recognized by the computer database maintained in the CR 90. Remote reading of the EF 30 by an Agent 91 of the CR 90 is achieved by connecting to the computer database in the CR 90 via a modem.

A Principal 10 desiring to obtain a CA 60 (FIG. 2) of the Signature 11 placed on the Will 20 takes the Will 20 to an Agent 91 of the CR 90 (FIG. 4). The Agent 91 connects the computer 71 of Agent 91 to a computer 70 of CR 90 via modem 73 and mechanically or optically 72 reads the EF 30. The computer 71 of Agent 91 will not display the PIN 31 but will only display the name of the Principal 10. Therefore, the Principal 10 and Agent 91 together will immediately know if the EF 30 confirms that the EF 30 was issued to the Principal 10. Assuming the EF 30 has been issued to the Principal 10 whose signature 11 is subscribed on the Will 20, the Agent 91 describes the Will 20 to the CR 90 so that the Code 32 encoded on the EF 30 and known only to the CR 90 is thereafter associated with the description of the Item 61—the Will 20. The CR 90 prepares a CA 60 (FIG. 2) which contains: the name of the Principal 10, a description of the Item 61, the name of the original Registrant 62, the date of the original registration 63, a place to identify subsequent registrants 62A and subsequent registration dates 63A, the name of the present registrant 62B and present registration date 63B, the date of the issuance 64 of the CA 60 and the name of the CR 90. The CR 90 prepares an EF 30A that is identical to the EF 30 found on the Will 20 and attaches it to the CA 60 with a tamper proof adhesive. The CA 60 is then delivered to the Principal 10. The CA 60 recites that the Principal 10 whose Signature 11 is subscribed on the Will 20 either signed the Will 20 and affixed the EF 30 to the Will 20 in the presence of the Agent 91 of the CR 90 or that the Principal 10 verified to the Agent 91 of the CR 90 that the signature 11 and the EF 30 were his or hers.

As a second preferred embodiment, a Holder 10A of the Will 20 on which an EF 30 has been placed but which has not been previously registered by the Principal 10 desiring to obtain another type of certificate of authenticity 60A (FIG. 3) of the Signature 11 placed on the Will 20 takes the Will 20 to an Agent 91 of the CR 90 (FIG. 4). The Agent 91 connects the computer 71 of Agent 91 to the computer 70 of CR 90 via modem 73 and mechanically or optically 72 reads the EF 30. The computer 71 of Agent 91 will display the name of the Principal 10 to whom the EF 30 had been issued. Therefore, the Holder 10A and Agent 91 will immediately know if the EF 30 confirms that the EF 30 was issued to the Principal 10. Assuming the EF 30 has been issued to the Principal 10 whose Signature 11 is subscribed on the Will 20, the Agent 91 describes the Will 20 to the CR 90 so that the Code 32 encoded on the EF 30 and known only to the CR 90 is thereafter associated with the Will 20. The CR 90 prepares a CA 60A (FIG. 3) which contains: the name of the Principal 10, a description of the Item 61, the name of the original registrant 62, the date of the original registration 63, a place to identify subsequent registrants 62A and subsequent registration dates 63A, the name of the present registrant 62B and present registration date 63B, the date of the issuance 64 of the CA 60A and the name of the CR 90. The CR 90 prepares an EF 30A that is identical to the EF 30 found on the Will 20 and attaches it to the CA 60A with a tamper proof adhesive. The CA 60A is then delivered to the Holder 10A who now becomes the present registrant 62B. The CA 60A recites that the EF 30 affixed to the Will 20 was issued to the Principal 10 whose Signature 11 is found on the Will 20.

A subsequent Holder 10B of the Will 20 can take the Will 20 and the CA 60 (FIG. 2) or CA 60A (FIG. 3) to an Agent 91 who can authenticate both the EF 30 found on the Will 20 and the EF 30A found on the CA 60 or CA 60A. As the Will 20 has already been registered with the CR 90, the computer 71 of Agent 91 would display not only the name of the Principal 10 but also a description of the Item 61, the name of the original registrant 62, the date of the original registration 63, the name of the subsequent registrant 62A and subsequent registration dates 63A, the name of the present registrant 62B and the date of the present registration 63B. The subsequent Holder 10B could then become the present registrant 62B and have a new CA 60A issued in his or her name.

FIG. 4 is a flow diagram illustrating the authentication process described above wherein the Agent 91 mechanically or optically 72 reads the EF 30 and the computer 71 of Agent 91 communicates with computer 70 of CR 90 via a modem 73. The computer 71 of Agent 91 will not display the PIN 31 or the Code 32 but only displays the name of the Principal 10, and if already registered, a description of the Item 61 the Will 20, the name of the original registrant 62, the date of the original registration 63 of the Item 61, the Will 20, the name of subsequent registrants 62A and dates of subsequent registrations 63A, and the name of the present registrant 62B and date of present registration 63B. The database of CR 90 will include the PIN 31 and Code 32 in addition to the name of the Principal 10 and if registered, the name of the Item 61, the Will 20, the name of the original registrant 62, the date of the original registration 63, the name of subsequent registrants 62A and the date of the subsequent registrations 63A, and the name of the present registrant 62B and date of present registration 63B.

As a third preferred embodiment, Principal 10, as depicted by a name, is presumed to desire to utilize the system to authenticate his or her own signature by contacting a CR 90, depicted by a signature. THE CR 90 would issue to the Principal 10 a unique PIN 31. The CR 90 would also encode all EFs 30 issued to the Principal 10 with the PIN 31 of Principal 10 and also sequentially encode each EF 30 with a unique Code 32.

An exemplary document in the form of a Will 20 is illustrated in FIG. 1A. The Will 20 in this example has a Signature 11 thereon of the Principal 10. After the Principal 10 signs the Will 20, the Agent 91 of the CR 90 scans the Signature 11 with the Image/Bar Code reader 72. An EF 30 is printed that contains an exact Facsimile Signature 33 of the Signature 11 that has been placed on the Will 20 along with the Principal's PIN 31 and the Code 32. The EF 30 is then placed on the Will 20 with an adhesive (not shown but is known in the art) so as to be tamper proof. The EF 30 cannot be duplicated and the PIN 31, Code 32 and Facsimile Signature 33 cannot be read without the use of the computer program that encoded them. Therefore, the PIN 31, Code 32 and Facsimile Signature 33 can only be read and recognized by the computer database maintained by the CR 90. Remote encoding and reading of the EF 30 by an Agent 91 of the CR 90 is achieved by connecting to the computer database via modem 73. The scanning of the Signature 11 and encoding into a two dimensional bar code 32 can be accomplished by a Model IR-2000 Image/Bar Code Reader manufactured by Metanetics Corporation of Fort Myers, Fla.

Figure 4A:
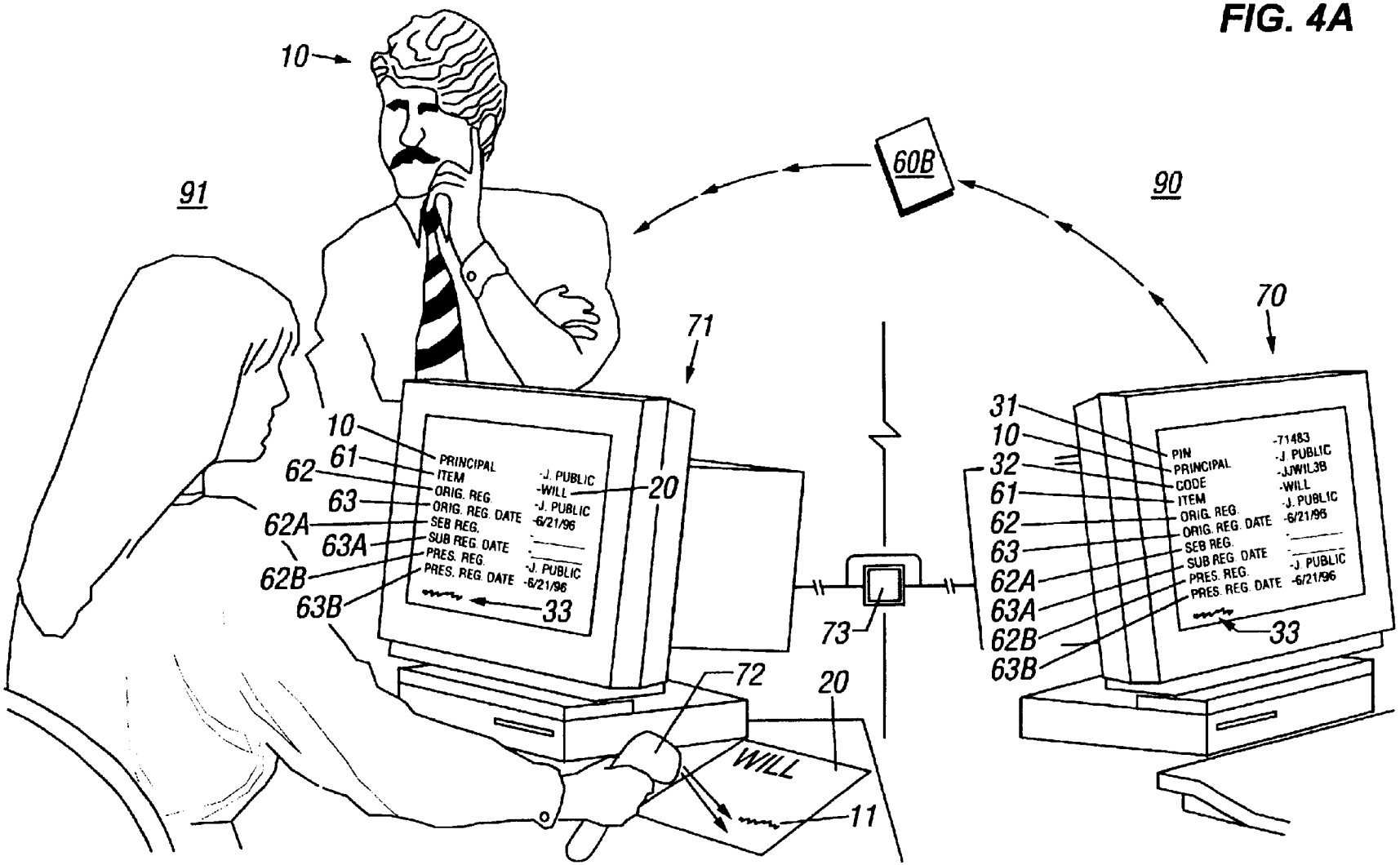
FIG. 4A is a flow diagram of a preferred embodiment of the invention showing the initial scanning of the Signature.

A Holder 10A desiring to obtain a CA 60B (FIG. 2A) of the Signature 11 placed on the Will 20 takes the Will 20 to an Agent 91 of the CR 90 (FIG. 4A). The Agent 91 connects the computer 71 of Agent 91 to a computer 70 of the CR 90 via modem 73 and mechanically or optically 72 reads the EF 30. The computer 71 of the Agent 91 will display the name of the Principal 10, a description of the Item 61, the name of the original registrant 62, the date of the original registration 63, the name of the subsequent registrant 62A and subsequent registration dates 63A, the name of the present registrant 62B and the date of the present registration 63B and the Facsimile Signature 33. The Agent 91 can verify the information encoded in the EF 30 and can compare the Signature 11 found on the Will 20 with the Facsimile Signature 33 displayed on the Agent 91 computer 71. The CR 90 prepares an EF 30A that is identical to the EF 30 found on the Will 20 and attaches it to the CA 60B with a tamper proof adhesive. The CA 60B is then delivered to the Holder 10A. The CA 60B recites that the Principal 10 whose Signature 11 is subscribed to the Will 20 signed the Will 20 in the presence of the then Agent 91 of the CR 90 and that the Facsimile Signature 33 of the Principal 10 found on the EF 30 exactly matches the Signature 11 of the Principal 10 found on the Will 20. An EF 30A is attached to the CA 60B that is identical to EF 30 attached to or accompanying the Item.

Accordingly, the present invention provides Principal 10 with a unique PIN 31, Code 32 and if desired Facsimile Signature 33 to be used by the Principal 10 to deter forgery of, and to authenticate his or her signature. Principals 10 and Holders 10A, 10B of Items 61 desiring to authenticate the signature of the Principal 10 take the Item 61 to an Agent 91 who mechanically or optically reads the EF 30 attached to the Item 61. Once an Item 61 is authenticated a CA 60, 60A or 60B can be issued by the CR 90. The CR 90 can also maintain a record of the chain of title to the Item 61.

Although the preferred embodiments of the invention described above uses two dimensional bar codes or alternatively a forgery proof diffraction grating pattern, many other information bearing media that are difficult to decode and replicate can also be used. For example a random dot matrix pattern may be used. However whatever method is used it must be capable of cryptically storing information in the form of PINs, Codes and Facsimile Signatures that can be read mechanically or optically. All of these media are currently available and can be applied to any Item to which a signature can be applied with a tamper proof adhesive such that attempted removal of the EF will result in destruction of the EF.

It will be apparent to those skilled in the art that the forgery deterrent and authentication system of the present invention may be modified in numerous ways and may assume many embodiments other than the preferred forms specifically set out and described above. Accordingly it is intended by the appended claims to cover all such modifications of the invention which fall within the broad scope of the invention disclosed above.

In another preferred embodiment of the present invention, the Principal's Signature that has been placed on an Item in the presence of an Agent of the CR is scanned by the Agent. The Signature is encoded into the EF along with the Principal's PIN and Code. When the EF is subsequently read the Facsimile Signature displayed on the Agent's computer screen will show exactly how the Signature placed on the Item should look. The EF is printed by the Agent and placed on the Item or an accompanying article. Registration takes place at the time the EF is placed on the Item. CA's are available from the CR as described above. With this preferred embodiment, a subsequent Holder of the Item will be able to not only verify that the Item has an appropriate EF but will also be able to compare the Signature found on the Item to the Facsimile Signature encoded on the EF.

I claim:

1. A forgery deterrent and authentication method for signatures, comprising the steps of:

a. registering [the] *a* principal with a central registrar that issues to the principal an information bearing medium that includes an encoded personal identification number and a second numbered code and facsimile signature;

b. placing the information bearing medium on an item by the principal next to the principal's signature with a tamper proof adhesive;

c. reading of the principal's information bearing medium placed on the item using the central registrar;

d. identifying the principal through the principal's personal identification number by the central registrar;

e. identifying of the item through the second numbered code by the central registrar;

f. identifying of the item through the facsimile signature by the central registrar;

g. providing a certificate of authenticity by the central registrar including thereon a second information bearing medium with an identical personal identification number and second numbered code; and h. maintaining a database that identifies principals, items, the current known holder of an item and the date of issuance of a certificate of authenticity.

2. The method of claim 1, wherein step c is performed by an agent.

3. The method of claim 1, wherein step d is performed by an agent.

4. The method of claim 1, wherein step e is at least one of the items include a signature and performed by an agent.

5. The method of claim 1, wherein step a includes the information bearing medium having a facsimile signature.

6. The method of claim 1, wherein step e includes the step of identifying the items through the facsimile signature by the central registrar.

*7. A forgery and authentication method for a signature on an item, comprising the steps of:*

*a. signing the item by a principal;*

*b. registering with a central registrar a facsimile signature of the principal; and*

*c. placing an information bearing medium having at least one numbered code on the item with a tamper proof adhesive.*

*8. The forgery deterrent and authentication method of claim 7, wherein the information bearing medium having at least one numbered code is placed on the item prior to the item being signed by the principal.*

*9. The forgery deterrent and authentication method of claim 7, wherein the information bearing medium having at least one numbered code is placed on the item prior to the item being registered with the central registrar.*

*10. The forgery deterrent and authentication method of claim 7, further comprising the step of maintaining a database that identifies the principal and the item.*

*11. The forgery deterrent and authentication method of claim 10, wherein the database identifies a current known holder of the item.*

*12. The method of claim 11, further including the step of providing a certificate of authenticity by the central registrar including thereon the facsimile signature.*

*13. The method of claim 10, further including the step of providing a certificate of authenticity by the central registrar including thereon the facsimile signature.*

*14. The method of claim 7, further including the step of providing a certificate of authenticity by the central registrar including thereon the facsimile signature.*

*15. A forgery deterrent and authentication method for a signature on an item, comprising the steps of:*

*a. signing the item by a principal;*

*b. registering with a central registrar a facsimile signature of the principal;*

*c. placing an information bearing medium having at least one numbered code on the item with a tamper proof adhesive;*

*d. registering the at least one numbered code with the central registrar;*

*e. reading the at least one numbered code using the central registrar;*

*f. identifying the principal through the at least one numbered code by the central registrar;*

*g. identifying the item through the at least one numbered code by the central registrar; and*

*h. maintaining a database by the central registrar that identifies the principal and the item.*

*16. The method of claim 15, further including the step of providing a certificate of authenticity by the central registrar including thereon the facsimile signature.*

*17. The forgery deterrent and authentication method of claim 15, wherein the information bearing medium having at least one numbered code is placed on the item prior to the item being signed by the principal.*

*18. The forgery deterrent and authentication method of claim 15, wherein the information bearing medium having at*

*least one numbered code is placed on the item prior to the item being registered with the central registrar.*

*19. The forgery deterrent and authentication method of claim 15, wherein the database identifies a current known holder of the item.*

*20. The method of claim 19, further including the step of providing a certificate of authenticity by the central registrar including thereon the facsimile signature.*

* * * * *